(12) United States Patent
Namikawa

(10) Patent No.: US 12,183,526 B2
(45) Date of Patent: Dec. 31, 2024

(54) BREAKER, SAFETY CIRCUIT AND SECONDARY BATTERY PACK

(71) Applicant: BOURNS KK, Suita (JP)

(72) Inventor: Masashi Namikawa, Suita (JP)

(73) Assignee: BOURNS KK, Suita (JP)

( * ) Notice: Subject to any disclaimer, the term of this patent is extended or adjusted under 35 U.S.C. 154(b) by 164 days.

(21) Appl. No.: 17/911,653

(22) PCT Filed: Mar. 4, 2021

(86) PCT No.: PCT/JP2021/008373
§ 371 (c)(1),
(2) Date: Sep. 15, 2022

(87) PCT Pub. No.: WO2021/187129
PCT Pub. Date: Sep. 23, 2021

(65) Prior Publication Data
US 2023/0142477 A1 May 11, 2023

(30) Foreign Application Priority Data
Mar. 18, 2020 (JP) ................................ 2020-047767

(51) Int. Cl.
*H01H 37/54* (2006.01)
*H01H 37/04* (2006.01)

(52) U.S. Cl.
CPC ...... *H01H 37/5409* (2013.01); *H01H 37/043* (2013.01); *H01H 37/5436* (2013.01); *H01H 2037/549* (2013.01)

(58) Field of Classification Search
CPC ............. H01H 37/5409; H01H 37/043; H01H 37/5436; H01H 2037/549; H01H 37/52; H01H 37/54; Y02E 60/10
See application file for complete search history.

(56) References Cited

U.S. PATENT DOCUMENTS 3,452,313 A * 6/1969 Perry ..................... H01H 37/54
337/363
4,231,010 A * 10/1980 Cardin ................... H01H 37/20
337/82

(Continued)

FOREIGN PATENT DOCUMENTS

EP 0966014 12/1999
GB 1172114 11/1969

(Continued)

OTHER PUBLICATIONS

Yamada Nobuhiro; Yoshioka Masaki; Yagi Kota, "Breaker, Safety Circuit, Secondary Battery Pack, and Portable Terminal", Aug. 31, 2017, Bourns KK, Entire Document (Translation of JP 2017152315). (Year: 2017).*

(Continued)

*Primary Examiner* — Stephen S Sul
(74) *Attorney, Agent, or Firm* — Muncy, Geissler, Olds & Lowe, P.C.

(57) ABSTRACT

A breaker is provided with a first terminal piece on which a fixed contact is formed, a movable piece with a movable contact for pressing the movable contact against the fixed contact so as to contact therewith, a thermally-actuated element deforming with a change in temperature and moving the movable piece so that the movable contact is separated from the fixed contact, and a second terminal piece electrically connected to the movable piece. The movable contact includes a first movable contact and a second movable contact arranged at a first end portion and a second end portion, respectively, of the movable piece in its longitudinal direction. The fixed contact includes a first fixed contact arranged at a position with which the first movable contact can contact, and a second fixed contact arranged at (Continued)

a position with which the second movable contact can contact.

12 Claims, 8 Drawing Sheets

(56) References Cited

U.S. PATENT DOCUMENTS

| | | | | |
|---|---|---|---|---|
| 4,555,686 A * | 11/1985 | Pejouhy | ............... | H01H 37/54 337/102 |
| 4,866,408 A * | 9/1989 | Petraitis | ............ | H01H 37/5418 337/368 |
| 5,497,286 A * | 3/1996 | Shimada | ............... | H01H 81/02 337/380 |
| 6,005,471 A * | 12/1999 | Higashikata | ....... | H01H 37/5427 337/368 |
| 6,020,801 A * | 2/2000 | Passow | ............... | H01H 71/10 335/78 |
| 6,249,211 B1 | 6/2001 | Hofsaess | | |
| 7,859,370 B2 * | 12/2010 | Shirakawa | ........... | G02B 6/3564 335/78 |
| 8,264,317 B2 * | 9/2012 | Higashikata | ......... | H01H 37/002 337/380 |
| 9,653,240 B2 * | 5/2017 | Namikawa | ......... | H01H 37/5427 |
| 2005/0189206 A1 * | 9/2005 | Takeda | ............... | H01H 1/2016 200/400 |
| 2010/0259356 A1 * | 10/2010 | Chung | ............... | H01H 37/5427 337/334 |
| 2013/0299323 A1 * | 11/2013 | Tanaka | ............... | H01H 1/2016 200/244 |
| 2014/0334055 A1 * | 11/2014 | Namikawa | ............. | H01H 61/04 429/61 |
| 2016/0012997 A1 * | 1/2016 | Neuhaus | ............... | H01H 50/58 335/189 |
| 2016/0035522 A1 * | 2/2016 | Namikawa | ............. | H01H 37/52 337/362 |
| 2018/0358186 A1 * | 12/2018 | Hayashida | ............... | H01H 1/54 |
| 2019/0013172 A1 * | 1/2019 | Hayashida | ............... | H01H 50/58 |
| 2019/0304729 A1 * | 10/2019 | Minowa | ............... | H01H 50/42 |

FOREIGN PATENT DOCUMENTS

| | | |
|---|---|---|
| JP | 2006-331705 A | 12/2006 |
| JP | 2017152315 A * | 8/2017 |
| KR | 1020080024846 | 3/2008 |
| WO | 2020031849 | 2/2020 |

OTHER PUBLICATIONS

The extended European search report of the corresponding EP application No. 21770992.2 mailed Jan. 30, 2024.

* cited by examiner

BREAKER, SAFETY CIRCUIT AND SECONDARY BATTERY PACK

TECHNICAL FIELD

The present invention relates to a breaker for use in a safety circuit of an electric device, and the like.

BACKGROUND ART

There has been disclosed a breaker provided with a pair of fixed contacts and a pair of movable contacts (see, for example, Patent Document 1).

PRIOR ART DOCUMENT

Patent Document

Patent Document 1: Japanese Patent Application Publication No. 2006-331705

SUMMARY OF THE INVENTION

Problems to be Resolved by the Invention

In the breaker disclosed in Patent Document 1, a pair of contacts are connected in series. Therefore, it has been difficult to reduce the resistance between terminals.

The present invention has been devised in view of the above circumstance, and a primary objective of the present invention is to provide a breaker in which the resistance between terminals can be reduced.

Means for Solving the Problems

The present invention is a breaker provided with
a first terminal piece on which a fixed contact is formed,
a movable piece with a movable contact for pressing the movable contact against the fixed contact so as to contact therewith,
a thermally-actuated element deforming with a change in temperature and moving the movable piece so that the movable contact is separated from the fixed contact, and
a second terminal piece electrically connected to the movable piece, wherein
the movable contact includes
a first movable contact disposed in a first end portion of the movable piece in its longitudinal direction, and
a second movable contact disposed in a second end portion of the movable piece in the longitudinal direction, and
the fixed contact includes
a first fixed contact disposed at a position where the first movable contact can contact therewith, and
a second fixed contact disposed at a position where the second movable contact can contact therewith.

In the breaker according to the present invention, it is preferable that the movable piece has, between the first movable contact and the second movable contact, a first contact region contacting with the second terminal piece.

In the breaker according to the present invention, it is preferable that a first portion of the movable piece on the first end portion side of the first contact region, and a second portion of the movable piece on the second end portion side of the first contact region, have different natural vibration frequencies.

In the breaker according to the present invention, it is preferable that the thermally-actuated element has a top portion protruding toward the movable piece, and
the first contact region is provided in an area overlapping with the top portion when viewed from a thickness direction of the movable piece.

In the breaker according to the present invention, it is preferable that the movable piece has a first bent portion which is bent so that the first movable contact approaches the first fixed contact.

In the breaker according to the present invention, it is preferable that the movable piece has, between the first movable contact and the first bent portion, a first protrusion protruding toward the thermally-actuated element.

In the breaker according to the present invention, it is preferable that the second terminal piece has
a second contact region contacting with the first contact region, and
a first convex portion protruding toward the movable piece, between the first protrusion and the second contact region.

The present invention is a safety circuit for an electric device provided with the above-said breaker.

The present invention is a secondary battery pack provided with the above-said breaker.

Effect of the Invention

In the breaker according to the present invention, the first terminal piece is provided with the first fixed contact and the second fixed contact, and the movable piece is electrically connected to the second terminal piece.

When the first movable contact of the movable piece contacts with the first fixed contact, and the second movable contact of the movable piece contacts with the second fixed contact, then parallel circuits are formed between the first terminal piece and the second terminal piece. Thereby, the resistance between the first terminal piece and the second terminal piece is reduced.

MODE FOR CARRYING OUT THE INVENTION

A breaker according to an embodiment of the present invention will now be described with reference to the drawings.

Figure 1:
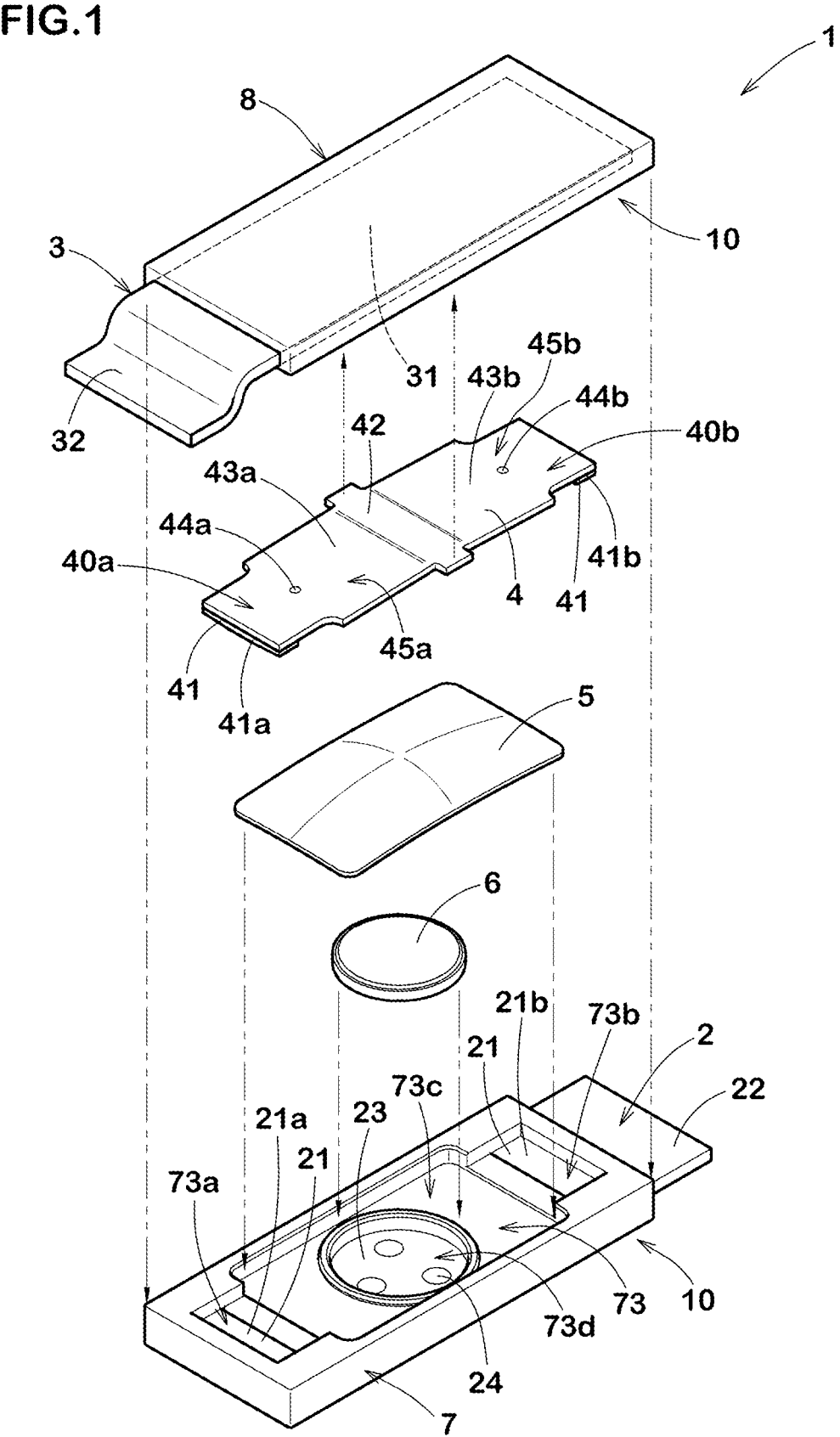
FIG. 1 is a perspective view before assembling, showing a schematic configuration of a breaker according to an embodiment of the present invention.
Figure 2:
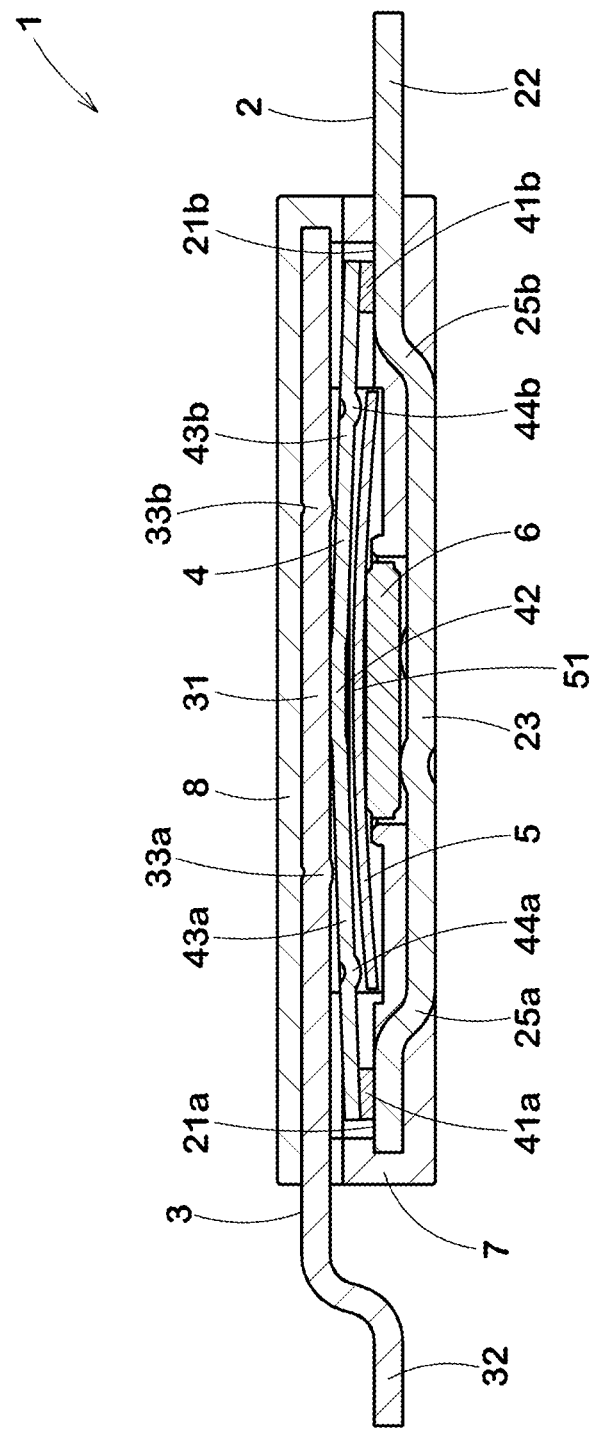
FIG. 2 is a cross-sectional view showing the breaker in a normal charge/discharge state.
Figure 3:
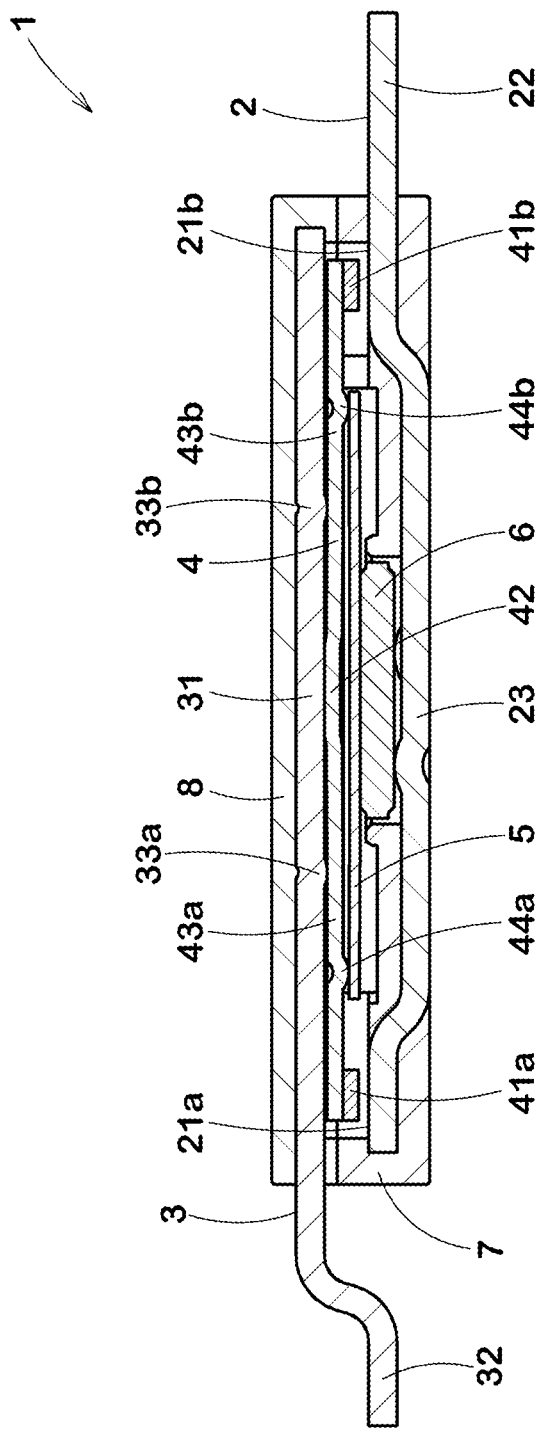
FIG. 3 is a cross-sectional view showing the above breaker in an overcharged state or an abnormal state.

FIG. 1 to FIG. 3 show the structure of the breaker 1.

As shown in FIG. 1 and FIG. 3, the breaker 1 is provided with a first terminal piece 2, a second terminal piece 3, a movable piece 4, a thermally-actuated element 5, a PTC (Positive Temperature Coefficient) thermistor 6, etc.

By connecting the first terminal piece 2 and the second terminal piece 3 to an external circuit, the breaker 1 constitutes an essential part of a safety circuit of an electric device.

The first terminal piece 2, the second terminal piece 3, the movable piece 4, the thermally-actuated element 5, and the PTC thermistor 6 are housed in a case 10. The case 10 is composed of a case main body (first case) 7 and a lid member (second case) 8 mounted on the upper surface of the case main body 7.

The first terminal piece 2 is formed into a plate shape by pressing a metal plate containing, as a main component, copper or the like for example (in addition, a metal plate such as a copper-titanium alloy, nickel silver, or brass).

The first terminal piece 2 has its longitudinal direction. The first terminal piece 2 is embedded in the case main body 7 by insert molding.

The first terminal piece 2 has a pair of fixed contacts 21 and a first terminal 22.

The second terminal piece 3 has a second terminal 32.

The second terminal piece 3 is electrically connected to the movable piece 4.

The movable piece 4 has a pair of movable contacts 41, and presses the movable contacts 41 against the fixed contacts 21 to bring the movable contacts into contact with the fixed contacts.

The thermally-actuated element 5 is deformed with a temperature change, and actuates the movable piece 4 so that the movable contacts 41 are separated from the fixed contacts 21.

The fixed contacts 21 include a first fixed contact 21a and a second fixed contact 21b. The first fixed contact 21a and the second fixed contact 21b are formed by clad, plating or coating of a highly conductive material such as silver, nickel, nickel-silver alloy, copper-silver alloy, gold-silver alloy and the like.

The first fixed contact 21a and the second fixed contact 21b are formed on one of surfaces of the first terminal piece 2.

In the present application, unless otherwise noted, in the first terminal piece 2, the surface on the side where the fixed contacts 21 are formed (that is, the surface on the upper side in FIG. 1) is described as A side, and the bottom surface on the opposite side thereto is descried as B side.

The same is applied to other parts such as the second terminal piece 3, the movable piece 4, the thermally-actuated element 5, the case 10, and the like.

The first fixed contact 21a is formed in one end portion of the first terminal piece 2.

The first fixed contact 21a is exposed to an accommodating recess 73 of the case main body 7 through a part of an opening 73a formed inside the case main body 7.

The first terminal 22 is formed at the other end portion of the first terminal piece 2. The first terminal 22 projects from a side wall of the case main body 7 and is connected to an external circuit.

The second fixed contact 21b is formed near the first terminal 22, that is, in the other side of the first terminal piece 2. The second fixed contact 21b is exposed to the accommodating recess 73 of the case main body 7 through a part of an opening 73b formed inside the case main body 7.

Between the first fixed contact 21a and the second fixed contact 21b, there is formed a support portion 23 for supporting the PTC thermistor 6.

The support portion 23 is exposed to the accommodating recess 73 of the case main body 7 through a part of the opening 73d formed inside the case main body 7, and is electrically connected to the PTC thermistor 6.

As shown in FIG. 2, the first terminal piece 2 is bent in a stepped shape (a crank shape in a side view), and has a first-step bent portion 25a and a second-step bent portion 25b.

The first-step bent portion 25a connects the first fixed contact 21a and the support portion 23, and arranges the first fixed contact 21a and the support portion 23 at different heights.

The second-step bent portion 25b connects the second fixed contact 21b and the support portion 23, and arranges the second fixed contact 21b and the support portion 23 at different heights. Thereby, the PTC thermistor 6 can be housed compactly.

The second terminal piece 3 is formed in a plate shape by pressing a metal plate containing, as a main component, copper or the like similarly to the first terminal piece 2. The second terminal piece 3 has its longitudinal direction.

The second terminal piece 3 is embedded in the lid member 8 by insert molding. The second terminal piece 3 is arranged so that the longitudinal direction of the second terminal piece 3 is parallel to the longitudinal direction of the first terminal piece 2.

The second terminal piece 3 has a connection portion 31 to which the movable piece 4 is electrically connected, and the second terminal 32 to be electrically connected to an external circuit. The connection portion 31 is arranged at a position facing a first contact region 42, which will be described later.

The second terminal 32 is formed on one side of the second terminal piece 3 (that is, on the side of the first fixed contact 21a in the first terminal piece 2).

The second terminal 32 projects from the side wall of the case main body 7 and is connected to an external circuit.

The second terminal 32 is exposed, in the inside of the lid member 8, to the internal space of the case 10 for accommodating the movable piece 4 and the like.

The second terminal piece 3 functions to reinforce the lid member 8. That is, the second terminal piece 3 increases the rigidity and strength of the lid member 8 and thus the case 10 as the housing, and contributes to the miniaturization of the breaker 1.

The movable piece 4 is formed in a plate shape by pressing a metal material containing, as a main component, copper or the like. The movable piece 4 has its longitudinal direction. The movable piece 4 is formed in an arm shape symmetrical with respect to its center line in the longitudinal direction.

At both ends of the movable piece 4, the movable contacts 41 are formed.

The movable contacts 41 are formed on the B side of the movable piece 4 with the same material as the fixed contact 21, and are joined to the movable piece 4 through a technique such as welding, clad, crimping or the like.

The movable contacts 41 include a first movable contact 41a and a second movable contact 41b. The first movable contact 41a is arranged at a first end portion 40a of the movable piece 4 in its longitudinal direction, and the second movable contact 40b is arranged at a second end portion 40b of the movable piece 4 in the longitudinal direction.

The movable piece 4 is arranged so that the longitudinal direction of the movable piece 4 is parallel to the longitudinal direction of the first terminal piece 2. Further, the movable piece 4 is arranged so that the first movable contact 41a is positioned to be in contact with the first fixed contact 21a, and
the second movable contact 41b is positioned to be in contact with the second fixed contact 21b.

In other words, the first fixed contact 21a faces the first movable contact 41a and is arranged at a position where they can contact each other, and the second fixed contact 21b faces the second movable contact 41b and is arranged at a position where they can contact each other.

Between the first movable contact 41a and the second movable contact 41b, there is formed a first contact region 42 electrically connected to the second terminal piece 3. Thereby, the second movable contact 41b is arranged on the opposite side to the first movable contact 41a with respect to the first contact region 42 located therebetween.

The second terminal 32 of the second terminal piece 3 and the first movable contact 41a and the second movable contact 41b are conductive via the first contact region 42.

Through the first contact region 42, electrical continuity is established between the second terminal 32 of the second terminal piece 3 and the first movable contact 41a and the second movable contact 41b.

The movable piece 4 has a first elastic portion 43a between the first movable contact 41a and the first contact region 42. The first elastic portion 43a extends from the first contact region 42 toward the first movable contact 41a. Further, the movable piece 4 has a second elastic portion 43b between the second movable contact 41b and the first contact region 42. The second elastic portion 43b extends from the first contact region 42 toward the second movable contact 41b.

The first contact region 42 is formed wider than the first elastic portion 43a and the second elastic portion 43b. Thereby, the contact resistance between the connection portion 31 and the first contact region 42 is reduced.

The thermally-actuated element 5 shifts the state of the movable piece 4 from a conductive state in which the movable contact 41 is in contact with the fixed contact 21 to a cutoff state in which the movable contact 41 is separated from the fixed contact 21.

In the conductive state, the first movable contact 41a is in contact with the first fixed contact 21a, and the second movable contact 41b is in contact with the second fixed contact 21b.

The thermally-actuated element 5 has an initial shape curved in an arc shape, and is formed by laminating thin plates having different coefficients of thermal expansion.

The curved shape of the thermally-actuated element 5 is reversely warped with a snap motion when it reaches an operating temperature by overheating, and is reset when it becomes below the reset temperature by cooling.

The initial shape of the thermally-actuated element 5 can be provided through a press working.

The material and shape of the thermally-actuated element 5 are not particularly limited as long as the first elastic portion 43a and the second elastic portion 43b of the movable piece 4 are pushed up at a desired temperature owing to the reversely warping motion of the thermally-actuated element 5, and returns to the original by the elastic force of the first elastic portion 43a and the second elastic portion 43b. But, a rectangular shape is desirable in view of the productivity and the efficiency of the reversely warping motion. Further, a rectangular shape close to a square is desirable in order to push up the first elastic portion 43a and the second elastic portion 43b effectively while being compact.

As the materials of the thermally-actuated element 5, two kinds of materials having different thermal expansion rates such as various alloys, for example, copper-nickel-manganese alloy and nickel-chromium-iron alloy on the high expansion rate side, and iron-nickel alloy, nickel silver, brass, stainless steel on the low expansion rate side, are used by being combined and laminated according to the required conditions.

The PTC thermistor 6 is placed on convex protrusions (DABO) 24 formed at three positions on the support portion 23 of the first terminal piece 2, and is supported by the protrusions 24. When the movable piece 4 is in the cutoff state, the PTC thermistor 6 makes the first terminal piece 2 conductive with the second terminal piece 3 and the movable piece 4.

The PTC thermistor 6 is disposed between the support portion 23 of the first terminal piece 2 and the thermally-actuated element 5. When the current between the first terminal piece 2 and the movable piece 4 is cut off by the reversely warping motion of the thermally-actuated element 5, the current flowing through the PTC thermistor 6 is increased.

As long as the PTC thermistor 6 is a positive temperature coefficient thermistor which can limits its current by its resistance increasing with the temperature rise, its type can be arbitrary selected according to the requirements such as the operating current, operating voltage, operating temperature, and reset temperature. And its material and shape are not particularly limited as long as they do not impair these characteristics. In this embodiment, a ceramic sintered body containing barium titanate, strontium titanate, or calcium titanate is used. Aside from the ceramic sintered body, a so-called polymer PTC in which conductive particles such as carbon are contained in a polymer may be used.

The case main body 7 and the lid member 8 constituting the case 10 are molded from a thermoplastic resin, e.g. flame-retardant polyamide, polyphenylene sulfide (PPS) having excellent heat resistance, liquid crystal polymer (LCP), polybutylene terephthalate (PBT) and the like.

An insulating material other than the resin may be applied as long as the characteristics equal to or higher than those of the above-mentioned resin can be obtained. It may be possible to employ an insulating material other than resins if properties compatible or higher than the above-mentioned resins can be obtained.

The case main body 7 is provided with an accommodating recess 73, which is an internal space accommodating the movable piece 4, the thermally-actuated element 5, the PTC thermistor 6, and the like.

The accommodating recess 73 has
openings 73a and 73b for receiving the first movable contact 41a and the second movable contact 41b of the movable piece 4,
an opening 73c for receiving the movable piece 4 and the thermally-actuated element 5, and
an opening 73d for receiving the PTC thermistor 6, and the like.

The edge of the thermally-actuated element 5 mounted in the case main body 7 is appropriately contacted by a frame formed inside the accommodating recess 73, and is guided when the thermally-actuated element 5 is reversely warped.

As shown in FIG. 1, the lid member 8 is attached to the case main body 7 so as to close the openings 73a, 73b, 73c, etc. of the case main body 7 accommodating the fixed contact 21, the movable piece 4, the thermally-actuated element 5, the PTC thermistor 6, and the like.

The case main body 7 and the lid member 8 are joined by ultrasonic welding for example. At this time, the case main body 7 and the lid member 8 are joined continuously over the entire circumference of the outer edge portion of each of the case main body and the lid member, and the airtightness of the case 10 is improved. Thereby, the internal space of the case 10 provided by the accommodating recess 73 is sealed, and the parts such as the movable piece 4, the thermally-actuated element 5, and the PTC thermistor 6 can be shielded and protected from the atmosphere outside the case 10.

FIG. 2 shows the operation of the breaker 1 in a normal charging/discharging state. In the normal charge/discharge state, the thermally-actuated element 5 maintains its initial shape (before reversely warped). In this state, the first fixed contact 21a is in contact with the first movable contact 41a, and the second fixed contact 21b is in contact with the second movable contact 41b. Since the second terminal piece 3 and the first contact region 42 of the movable piece 4 are electrically connected to each other, the first terminal piece 2 and the second terminal piece 3 of the breaker 1 are conducted with each other through the movable piece 4.

It may be possible that the movable piece 4 and the thermally-actuated element 5 are in contact with each other, and the movable piece 4, the thermally-actuated element 5, the PTC thermistor 6 and the first terminal piece 2 are electrically connected as a circuit.

FIG. 3 shows the operation of the breaker 1 under an overcharge condition, an abnormal state and the like.

When the temperature becomes high due to overcharging or abnormality, the thermally-actuated element 5 reached to the operating temperature, warps reversely, and the first elastic portion 43a of the movable piece 4 is pushed up, and thereby the first movable contact 41a is separated from the first fixed contact 21a. Further, the second elastic portion 43b of the movable piece 4 is pushed up, and the second movable contact 41b is separated from the second fixed contact 21b.

The operating temperature of the thermally-actuated element 5, at which the thermally-actuated element 5 is deformed in the inside of the breaker 1 and pushes up the movable piece 4, is from 70 degrees C. to 90 degrees C., for example. At this time, the current flowing between the first fixed contact 21a and the first movable contact 41a and the current flowing between the second fixed contact 21b and the second movable contact 41b are cut off, and a slight leakage current will flow through the thermally-actuated element 5 and the PTC thermistor 6.

As far as such leakage current flows, the PTC thermistor 6 continues to generate heat and keeps the thermally-actuated element 5 in the reversely warped state to greatly increase the resistance. Therefore, the current does not flow through the paths between the first fixed contact 21a and the first movable contact 41a and between the second fixed contact 21b and the second movable contact 41b, and only the above described small leakage current exists (constituting the self-holding circuit). This leakage current can be utilized for other functions of a safety device.

Figure 4:
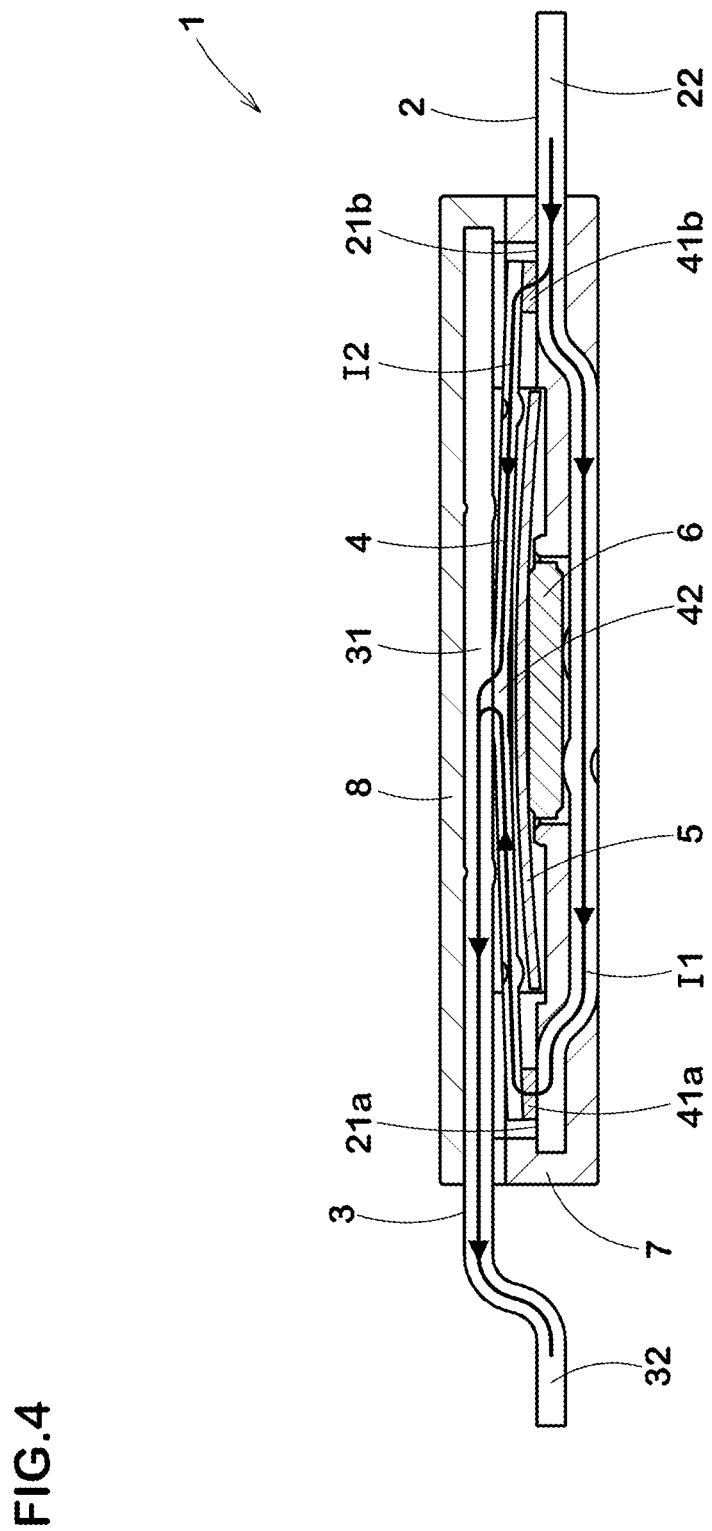
FIG. 4 is a cross-sectional view showing a path formed in the breaker under the conductive state, through which an electric current flows.

FIG. 4 shows a path formed in the breaker 1 through which a current flows in the conductive state.

As described above, in the breaker 1, the first terminal piece 2 is provided with the first fixed contact 21a and the second fixed contact 21b, and the movable piece 4 is electrically connected to the second terminal piece 3. The movable piece 4 is provided with the first movable contact 41a and the second movable contact 41b.

When the first movable contact 41a of the movable piece 4 comes into contact with the first fixed contact 21a, there is formed a first path I1 from the first terminal piece 2 to the second terminal piece 3 through the first fixed contact 21a, the first movable contact 41a, the first elastic portion 43a, and the first contact region 42.

At the same time, when the second movable contact 41b of the movable piece 4 comes into contact with the second fixed contact 21b, there is formed a second path 12 from the first terminal piece 2 to the second terminal piece 3 through the second fixed contact 21b, the second movable contact 41b, the second elastic portion 43b, and the first contact region 42.

That is, between the first terminal piece 2 and the second terminal piece 3, there are formed parallel circuits.

Thereby, between the movable contact 41 and the first contact region 42, the cross-sectional area of the conductor becomes doubled, and the electrical resistance is reduced. Further, since the fixed contact 21 and the movable contact 41 come into contact with each other at two positions, their contact resistance is reduced. Thereby, the resistance between the first terminal piece 2 and the second terminal piece 3 is reduced.

Meanwhile, an increase of the cross-sectional area of the conductor can be achieved simply by increasing the width and thickness of the movable piece 4. However, when the width and thickness of the movable piece 4 are increased, the elastic force generated by the movable piece 4 also increases, so it is necessary to increase the thickness of the thermally-actuated element 5 and the like, and it becomes difficult to miniaturize the breaker 1.

Further, according to the breaker 1, the fixed contact 21 and the movable contact 41 come into contact with each other at two positions, so the conductive state between the first terminal piece 2 and the movable piece 4 is ensured. Therefore, even when a strong impact is applied to the breaker 1 due to a drop of the electric device in which the breaker 1 is incorporated, the conductive state between the first terminal piece 2 and the movable piece 4 is easily maintained, and the instantaneous interruption of the current supplied to the load can be suppressed.

It is preferable that the first contact region 42 comes into contact with the second terminal piece 3 between the first movable contact 41a and the second movable contact 41b. Thereby, the total length of the breaker 1 is easily shortened. Further, the contact resistance between the first contact region 42 and the second terminal piece 3 is easily reduced.

It is preferable that the movable piece 4 is fixed to the second terminal piece 3 in the first contact region 42. Thereby, the posture of the movable piece 4 is stabilized, and the contact resistance between the first contact region 42 and the second terminal piece 3 is easily reduced.

The fixing structure between the second terminal piece 3 and the movable piece 4 may be, for example, laser welding or resistance welding, bonding with a conductive adhesive, screwing, or the like.

It is preferable that the connection portion 31 and the first contact region 42 are formed as flat surfaces. According to such shape, the connection between the connection portion 31 and the first contact region 42 becomes easy.

In particular, in the example in which the second terminal piece 3 and the movable piece 4 are fixed to each other by welding, workability in the welding process is enhanced.

Further, it is possible to easily secure the contact area between the connection portion 31 and the first contact region 42.

The movable piece 4 may be configured such that a natural vibration frequency of a first portion 45a on the first end portion 40a side of the first contact region 42 is different from a natural vibration frequency of a second portion 45b on the second end portion 40b side of the first contact region 42.

By making the natural vibration frequency of the first portion 45a different from the natural vibration frequency of the second portion 45b, even when impacts of various strengths are applied to the breaker 1, the first movable contact 41a and the second movable contact 41b are prevented from being simultaneously separated from the fixed contacts 21, and the instantaneous interruption of the current supplied to the load is prevented.

The natural vibration frequencies of the first portion 45a and the second portion 45b can be easily realized by adjusting the lengths, widths and thicknesses of the first portion 45a and the second portion 45b.

The length of the first portion 45a is the length of the first portion 45a in the longitudinal direction of the movable piece 4, that is, the distance from the first contact region 42 to the extreme end of the first end portion 40a.

The width of the first portion 45a is the length of the first portion 45a in the short direction orthogonal to the longitudinal direction of the movable piece 4. If the length, width and thickness of the first portion 45a vary, the average values thereof may be used.

The same applies to the second portion 45b.

As shown in FIGS. 1 and 2, the thermally-actuated element 5 has a top portion 51 protruding toward the movable piece 4. The top portion 51 is such a portion where the distance between the second terminal piece 3 and the thermally-actuated element 5 becomes minimum when viewed from the short direction of the movable piece 4.

The first contact region 42 is formed in an area overlapping with the top portion 51 when viewed from the thickness direction of the movable piece 4.

Thereby, the entire length of the breaker 1 can be easily decreased while securing the gap between the first movable contact 41a and the first fixed contact 21a and the gap between the second movable contact 41b and the second fixed contact 21b in the cutoff state shown in FIG. 3.

Figure 5:
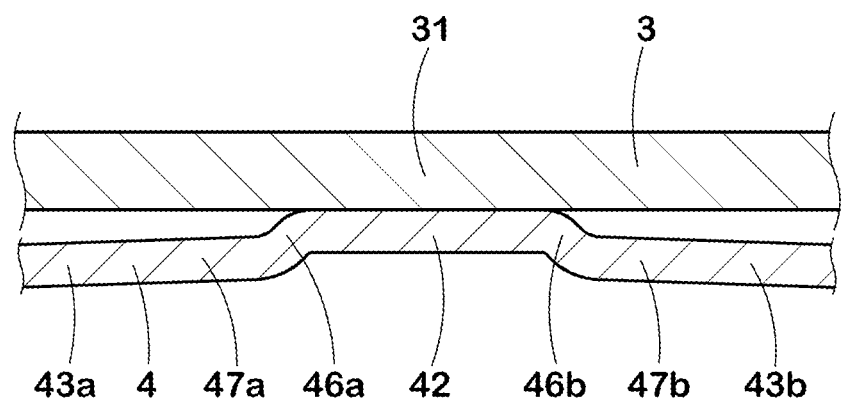
FIG. 5 is a cross-sectional view enlargedly showing a connection portion of the second terminal piece, the first contact region of the movable piece, and a periphery thereof.

FIG. 5 enlargedly shows the connection portion 31 of the second terminal piece 3, the first contact region 42 of the movable piece 4, and their neighborhood.

It is preferable that the movable piece 4 has a bent portion 46a located between the first contact region 42 and the first elastic portion 43a. The bent portion 46a is bent so that the first movable contact 41a approaches the first fixed contact 21a. By providing the movable piece 4 with the bent portion 46a, the contact pressure between the first movable contact 41a and the first fixed contact 21a is increased, and the contact resistance therebetween is reduced. Further, between the second terminal piece 3 and the first elastic portion 43a, there is formed a space for the first elastic portion 43a to be deformed, and in the cutoff state shown in FIG. 3, the gap between the first movable contact 41a and the first fixed contact 21a is easily secured.

Similarly, it is preferable that the movable piece 4 has a bent portion 46b located between the first contact region 42 and the second elastic portion 43b. The bent portion 46b is bent so that the second movable contact 41b approaches the second fixed contact 21b.

It is preferable that the movable piece 4 has a bent portion 47a located between the bent portion 46a and the first elastic portion 43a. The bent portion 47a is bent in the direction opposite to the bent portion 46a, that is, so that the first movable contact 41a is separated from the first fixed contact 21a. By providing the movable piece 4 with the bent portion 46a and the bent portion 47a, the thickness of the breaker 1 can be reduced while increasing the contact pressure between the first movable contact 41a and the first fixed contact 21a.

Similarly, it is preferable that the movable piece 4 has a bent portion 47b located between the bent portion 46b and the second elastic portion 43b. The bent portion 47b is bent in the direction opposite to the bent portion 46b, that is, so that the second movable contact 41b is separated from the second fixed contact 21b.

It is preferable that, as shown in FIGS. 2 and 3, the movable piece 4 has a protrusion 44a projecting toward the thermally-actuated element 5.

The protrusion 44a is disposed in the first elastic portion 43a between the first movable contact 41a and the bent portion 46a.

It is preferable that the protrusion 44a is disposed in the vicinity of the edge of the thermally-actuated element 5.

By providing the protrusion 44a in the first elastic portion 43a, the gap between the first movable contact 41a and the first fixed contact 21a is easily secured in the cutoff state shown in FIG. 3.

Similarly, it is preferable that the movable piece 4 has a protrusion 44b protruding toward the thermally-actuated element 5. The protrusion 44b is disposed in the second elastic portion 43b between the second movable contact 41b and the bent portion 46b.

It is preferable that the protrusion 44b is provided in the vicinity of the edge of the thermally-actuated element 5.

Only one of the protrusion 44a and the protrusion 44b may be provided.

It is preferable that the second terminal piece 3 has a convex portion 33a protruding toward the movable piece 4.

By providing the convex portion 33a on the second terminal piece 3, the contact pressure between the first movable contact 41a and the first fixed contact 21a in the conductive state shown in FIG. 2, is increased.

The convex portion 33a is disposed between the connection portion 31 and the protrusion 44a in the longitudinal direction of the movable piece 4.

The connection portion 31 is a second contact region which comes into contact with the first contact region 42.

By arranging the convex portion 33a between the connection portion 31 and the protrusion 44a, the gap between the first movable contact 41a and the first fixed contact 21a is easily secured in the cutoff state shown in FIG. 3.

Similarly, it is preferable that the second terminal piece 3 has a convex portion 33b protruding toward the movable piece 4. The convex portion 33b is disposed between the connection portion 31 and the protrusion 44b in the longitudinal direction of the movable piece 4.

Only one of the convex portion 33a and the convex portion 33b may be provided.

Figure 6:
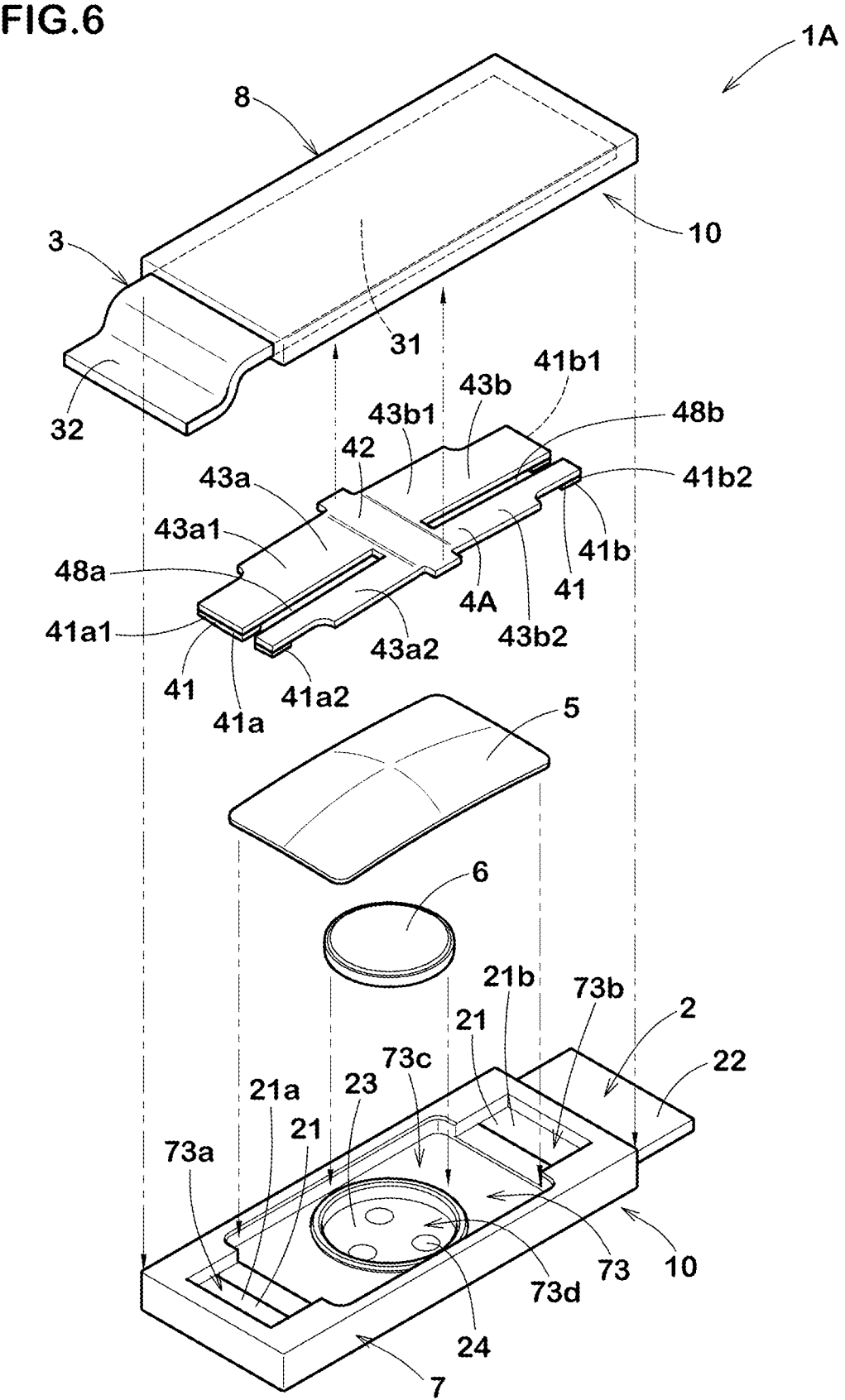
FIG. 6 is a perspective view before assembling, showing a modified example of the breaker shown in FIG. 1.

FIG. 6 is a perspective view of a breaker 1A, which is a modification of the breaker 1 shown in FIG. 1.

For the portion of the breaker 1A not described below, the above described structure of the breaker 1 may be adopted.

The breaker 1A includes the first terminal piece 2, the second terminal piece 3, a movable piece 4A, the thermally-actuated element 5, the PTC thermistor 6, and the like.

The movable piece 4A differs from the movable piece 4 shown in FIG. 1 in that it has two pairs of movable contacts 41a1, 41a2, 41b1, 41b2 and two pairs of elastic portions 43a1, 43a2, 43b1, 43b2.

Specifically, in the movable piece 4A, the first movable contact 41a includes a movable contact 41a1 and a movable contact 41a2, and
the first elastic portion 43a includes an elastic portion 43a1 and an elastic portion 43a2.

The movable contact 41a1 is formed in the elastic portion 43a1, and the movable contact 41a2 is formed in the elastic portion 43a2.

Similarly, in the movable piece 4A, the second movable contact 41b includes a movable contact 41b1 and a movable contact 41b2, and
the second elastic portion 43b includes an elastic portion 43b1 and an elastic portion 43b2.

The movable contact 41b1 is formed in the elastic portion 43b1, and the movable contact 41b2 is formed in the elastic portion 43b2.

The first elastic portion 43a is provided with a slit 48a. By the slit 48a, the first elastic portion 43a is divided into the elastic portion 43a1 and the elastic portion 43a2. Thereby, the elastic portion 43a1 and the elastic portion 43a2 can be deformed independently.

Similarly, the second elastic portion 43b is provided with a slit 48b. By the slit 48b, the second elastic portion 43b is divided into the elastic portion 43b1 and the elastic portion 43b2. Thereby, the elastic portion 43b1 and the elastic portion 43b2 can be deformed independently.

In the breaker 1A, the fixed contact 21 and the movable contact 41 are in contact with each other at four positions, and the conductive state between the first terminal piece 2 and the movable piece 4A is secured. Therefore, even when a strong impact is applied to the breaker 1A, the conductive state between the first terminal piece 2 and the movable piece 4A is easily maintained, and the instantaneous interruption of the current supplied to the load is prevented.

In the breaker 1A, it is preferable that the elastic portion 43a1 and the elastic portion 43a2 have different natural vibration frequencies, and
the elastic portion 43b1 and the elastic portion 43b2 have different natural vibration frequencies.

Further, it is preferable that the elastic portion 43a1 and the elastic portion 43b1 have different natural vibration frequencies, and
the elastic portion 43a2 and the elastic portion 43b2 have different natural vibration frequencies.

The adjustment of the natural vibration frequency can be realized in the same manner as the movable piece 4.

By making the natural vibration frequencies of
the elastic portion 43a1 and the elastic portion 43a2 and
the elastic portion 43b1 and the elastic portion 43b2 different,
even when an impact of various strengths is applied to the breaker 1A,
the first movable contact 41a and the second movable contact 41b are prevented from being simultaneously separated from the fixed contact 21, and the instantaneous interruption of the current supplied to the load is prevented.

Figure 7:
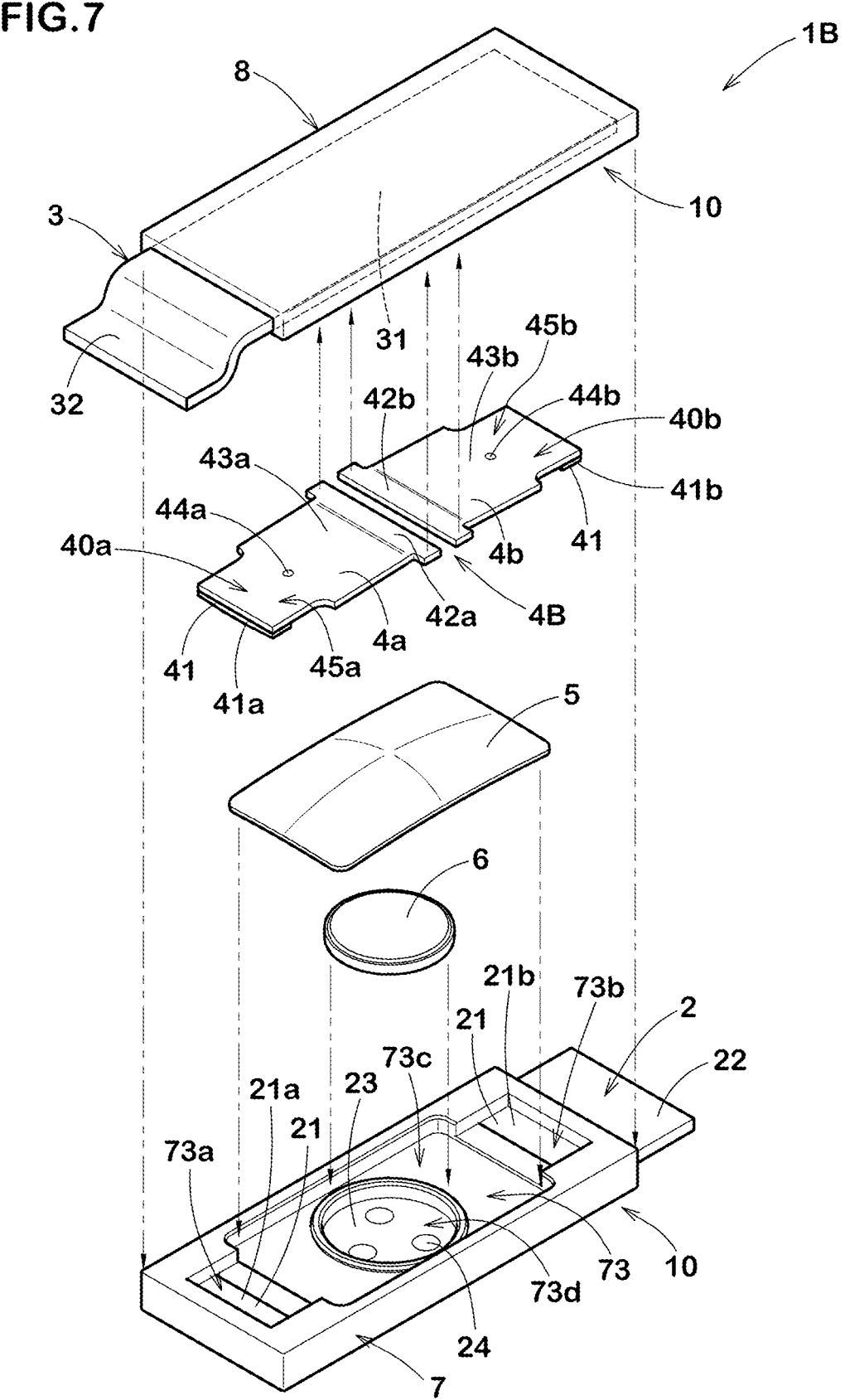
FIG. 7 is a perspective view before assembling, showing another modified example of the breaker shown in FIG. 1.

FIG. 7 is a perspective view of the breaker 1B, which is another modification of the breaker 1 shown in FIG. 1.

For the portion of the breaker 1B not described below, the structure of the breaker 1 described above can be adopted.

The breaker 1B comprises the first terminal piece 2, the second terminal piece 3, a movable piece 4B, the thermally-actuated element 5, the PTC thermistor 6 and the like.

The movable piece 4B includes a pair of movable pieces. That is, the movable piece 4B includes a first movable piece 4a and a second movable piece 4b.

The first movable piece 4a and the second movable piece 4b are arranged side by side in the longitudinal direction of the breaker 1B.

The first movable piece 4a is provided with the first movable contact 41a, a contact region 42a, and the first elastic portion 43a. It is preferable that the first elastic portion 43a is provided with the protrusion 44a.

The second movable piece 4b is provided with the second movable contact 41b, a contact region 42b, and the second elastic portion 43b. It is preferable that the second elastic portion 43b is provided with the protrusion 44b.

The natural vibration frequency of the first portion 45a of the first movable piece 4a and the natural vibration frequency of the second portion 45b of the second movable piece 4b are the same as those in the breaker 1.

In the movable piece 4B, too, the first elastic portion 43a of the movable piece 4a may be provided with a slit, and the second elastic portion 43b of the movable piece 4b may be provided with a slit, similarly to the movable piece 4A shown in FIG. 6.

Further, the movable piece 4B may include two or more pairs of movable pieces.

While detailed description has been made of the breaker 1, etc. according to the present invention, the present invention can be embodied in various forms without being limited to the above-described specific embodiments.

That is, it is sufficient for the breaker 1, etc. to include at least:
the first terminal piece 2 on which the fixed contact 21 is formed;
the movable piece 4 with the movable contact 41 for pressing the movable contact 41 against the fixed contact 21;
the thermally-actuated element 5 deforming with a change in temperature and moving the movable piece 4 so that the movable contact 41 is separated from the fixed contact 21; and
the second terminal piece 3 electrically connected to the movable piece 4, wherein
the movable contact 41 includes
the first movable contact 41a arranged at the first end portion 40a of the movable piece 4 in its longitudinal direction, and
the second movable contact 41b arranged at the second end portion 40b of the movable piece 4 in the longitudinal direction, and
the fixed contact 21 includes
the first fixed contact 21a arranged at a position with which the first movable contact 41a can contact, and
the second fixed contact 21b arranged at a position with which the second movable contact 41b can contact.

For example, by forming the movable piece 4 with a laminated metal such as a bimetal or a trimetal, the movable piece 4 may be integrally formed with the thermally-actuated element 5. In this case, the structure of the breaker 1, etc. is simplified.

Further, although the present embodiment has the self-holding circuit by the PTC thermistor 6, such configuration may be omitted, which can reduce the resistance between the terminals.

Further, in the breaker 1A, the movable piece 4 may be provided with three or more pairs of movable contacts 41 and the like.

Further, the breaker 1. etc. of the present invention can be widely applied to a secondary battery pack, a safety circuit for an electric device, and the like.

Figure 8:
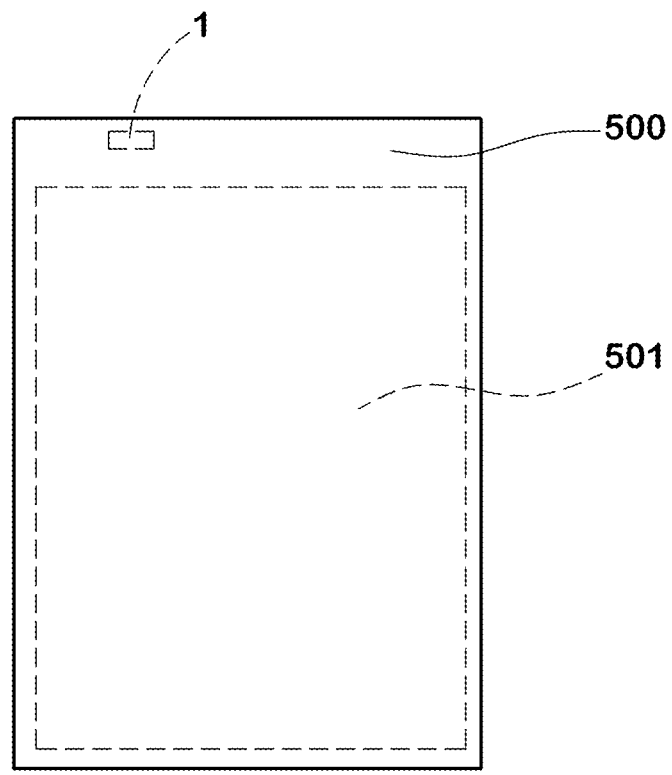
FIG. 8 is a plan view showing the configuration of a secondary battery pack provided with the breaker according to the present invention.

FIG. 8 shows the secondary battery pack 500.

The secondary battery pack 500 comprises a secondary battery 501, and the breaker 1, etc. provided in the output circuit of the secondary battery 501.

Figure 9:
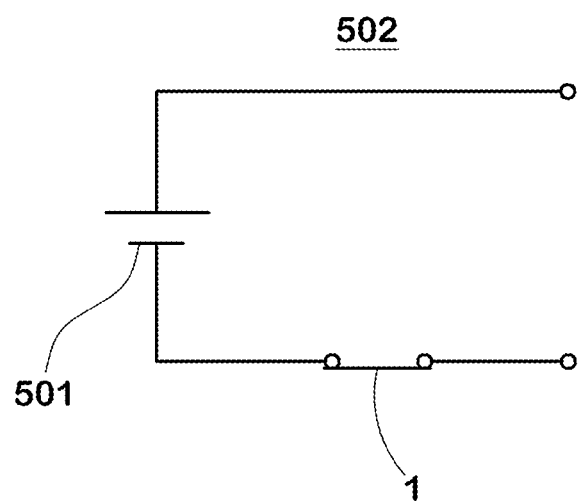
FIG. 9 is a circuit diagram of a safety circuit provided with the breaker according to the present invention.

FIG. 9 shows a safety circuit 502 for electric device.

The safety circuit 502 comprises the breaker 1, etc. provided in series in the output circuit of the secondary battery 501.

By a cable including a connector in which the breaker 1, etc. is incorporated, a part of the safety circuit 502 may be constituted.

DESCRIPTION OF THE SIGNS 1 breaker
1A breaker
2 first terminal piece
3 second terminal piece
4 movable piece
4A movable piece
5 thermally-actuated element
21 fixed contact
21a first fixed contact
21b second fixed contact
22 first terminal
32 second terminal
33a convex portion
33b convex portion
40a first end portion
40b second end portion
41 movable contact
41a first movable contact
41b second movable contact
42 first contact region
44a protrusion
44b protrusion
45a first portion
45b second portion
46a bent portion
46b bent portion
47a bent portion
47b bent portion
51 top portion
500 secondary battery pack
501 secondary battery
502 safety circuit

The invention claimed is:

1. A breaker comprising:
a first terminal piece on which a fixed contact is formed,
a movable piece with a movable contact for pressing the movable contact against the fixed contact so as to contact therewith,
a thermally-actuated element deforming with a change in temperature and moving the movable piece so that the movable contact is separated from the fixed contact, and
a second terminal piece electrically connected to the movable piece,
wherein
the movable contact includes
a first movable contact arranged at a first end portion of the movable piece in its longitudinal direction, and
a second movable contact arranged at a second end portion of the movable piece in the longitudinal direction, and the fixed contact includes
a first fixed contact arranged at a position with which the first movable contact can contact, and
a second fixed contact arranged at a position with which the second movable contact can contact, wherein
the movable piece has a first contact region contacting with the second terminal piece, between the first movable contact and the second movable contact.

2. The breaker as set forth in claim 1, wherein
in the movable piece, a natural vibration frequency of a first portion on the first end portion side of the first contact region is different from that of a second portion on the second end portion side of the first contact region.

3. The breaker as set forth in claim 2, wherein
the thermally-actuated element has a top portion protruding toward the movable piece, and
the first contact region is disposed in an area overlapping with the top portion when viewed from the thickness direction of the movable piece.

4. The breaker as set forth in claim 3, wherein
the movable piece has a first bent portion which is bent so that the first movable contact approaches the first fixed contact.

5. The breaker as set forth in claim 4, wherein
the movable piece has a first protrusion which protrudes toward the thermally-actuated element, between the first movable contact and the first bent portion.

6. The breaker as set forth in claim 5, wherein
the second terminal piece has
a second contact region contacting with the first contact region, and
a first convex portion which protrudes toward the movable piece, between the first protrusion and the second contact region.

7. The breaker as set forth in claim 1, wherein
the thermally-actuated element has a top portion protruding toward the movable piece, and
the first contact region is disposed in an area overlapping with the top portion when viewed from the thickness direction of the movable piece.

8. The breaker as set forth in claim 7, wherein
the movable piece has a first bent portion which is bent so that the first movable contact approaches the first fixed contact.

9. The breaker as set forth in claim 8, wherein
the movable piece has a first protrusion which protrudes toward the thermally-actuated element, between the first movable contact and the first bent portion.

10. The breaker as set forth in claim 9, wherein
the second terminal piece has
a second contact region contacting with the first contact region, and
a first convex portion which protrudes toward the movable piece, between the first protrusion and the second contact region.

11. A safety circuit for an electric device, comprising the breaker as set forth in claim 1.

12. A secondary battery pack comprising the breaker as set forth in claim 1.

* * * * *